(12) United States Patent
Ock

(10) Patent No.: US 11,543,990 B2
(45) Date of Patent: Jan. 3, 2023

(54) DATA STORAGE APPARATUS WITH EXTENDED LIFESPAN AND OPERATION METHOD THEREOF

(71) Applicant: SK hynix Inc., Gyeonggi-do (KR)

(72) Inventor: Eun Jae Ock, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 17/340,609

(22) Filed: Jun. 7, 2021

(65) Prior Publication Data

US 2022/0197534 A1 Jun. 23, 2022

(30) Foreign Application Priority Data

Dec. 22, 2020 (KR) .......................... 10-2020-0180487

(51) Int. Cl.
*G06F 12/00* (2006.01)
*G06F 3/06* (2006.01)

(52) U.S. Cl.
CPC ............ *G06F 3/0649* (2013.01); *G06F 3/064* (2013.01); *G06F 3/0619* (2013.01); *G06F 3/0644* (2013.01); *G06F 3/0659* (2013.01); *G06F 3/0673* (2013.01)

(58) Field of Classification Search
CPC ...... G06F 3/0649; G06F 3/0619; G06F 3/064; G06F 3/0644; G06F 3/0659; G06F 3/0673

USPC ......................................................... 711/165
See application file for complete search history.

(56) References Cited

U.S. PATENT DOCUMENTS

| | | | |
|---|---|---|---|
| 10,769,011 B2 * | 9/2020 | Kodera ............... | G06F 11/1052 |
| 2015/0339070 A1 * | 11/2015 | Lee ....................... | G06F 3/0679 711/103 |
| 2019/0179698 A1 * | 6/2019 | Liu ........................ | G06F 3/0614 |

FOREIGN PATENT DOCUMENTS

| | | | | |
|---|---|---|---|---|
| CN | 110658991 A | * | 1/2020 | ......... G06F 12/0246 |
| KR | 10-2019-0073132 A | | 6/2019 | |
| KR | 10-2019-0118030 A | | 10/2019 | |
| KR | 20220036468 A | * | 10/2020 | |

* cited by examiner

*Primary Examiner* — Mardochee Chery
(74) *Attorney, Agent, or Firm* — IP & T Group LLP

(57) ABSTRACT

A data storage apparatus may include a storage and a controller. The storage includes a plurality of planes each composed of a plurality of memory blocks, and is divided into a first region and a second region. An original of system data and a copy of the system data are stored in the first region. The controller is configured to perform a relief operation of moving the copy of the system data stored in a source memory block of the first region to a victim plane and switching the source memory block to a region replaceable with the second region.

25 Claims, 13 Drawing Sheets

FIG. 2

| | | D0 | | D1 | |
|---|---|---|---|---|---|
| | | P0 | P1 | P0 | P1 |
| 1201 | SR | SB000 | SB010 | SB100 | SB110 |
| | SR_C1 | SB000_C1 | SB010_C1 | SB100_C1 | SB110_C1 |
| | SR_C2 | SB000_C2 | SB010_C2 | SB100_C2 | SB110_C2 |
| 1203 | BG0 | UB000 | UB010 | UB100 | UB110 |
| | BG1 | UB001 | UB011 | UB101 | UB111 |
| | BG2 | UB002 | UB012 | UB102 | UB112 |
| | BG3 | UB003 | UB013 | UB103 | UB113 |
| | ... | ... | ... | ... | ... |
| | BGN | UB00N | UB01N | UB10N | UB11N |
| 1205 | | OPB000 | OPB010 | OPB100 | OPB110 |
| | | OPB001 | OPB011 | OPB101 | OPB111 |
| | | ... | ... | ... | ... |
| | | OPB00M | OPB01M | OPB10M | OPB11M |

12X

DATA STORAGE APPARATUS WITH EXTENDED LIFESPAN AND OPERATION METHOD THEREOF

CROSS-REFERENCES TO RELATED APPLICATION

The present application claims priority under 35 U.S.C. § 119(a) to Korean application number 10-2020-0180487, filed on Dec. 22, 2020, which is incorporated herein by reference in its entirety.

BACKGROUND

1. Technical Field

Various embodiments of the present disclosure generally relate to a semiconductor integrated apparatus, and more particularly, to a data storage apparatus and an operation method thereof.

2. Related Art

A data storage apparatus uses a volatile or nonvolatile memory apparatus as a storage medium and performs a data input/output operation according to a request of a host device.

An example of a data storage medium may include a storage apparatus using a flash memory apparatus. With an increase in capacity and improvement in price competitiveness according to the technical development of the flash memory apparatus, not only personal computers or mobile devices, but also data centers, which handle a large capacity of data, are adopting the storage apparatus using the flash memory apparatus.

In the flash memory apparatus, overwriting or in-place update is not possible, a read/write unit and an erase unit are different from each other, and a program/erase cycle is limited.

Due to such characteristics of the flash memory apparatus, the life of the flash memory apparatus is limited. Therefore, there is a need for a method capable of extending the life thereof by more efficiently using a limited capacity thereof.

SUMMARY

In an embodiment of the present disclosure, a data storage apparatus may include: a storage including a plurality of planes each composed of a plurality of memory blocks, each of the plurality of planes being divided into a first region where an original of system data and a copy of the system data are stored and a second region where user data is stored; and a controller configured to control an operation of the storage and to perform a relief operation of moving the copy of the system data stored in a source memory block of the first region to the second region of a victim plane and switching the source memory block to a region replaceable with the second region.

In an embodiment of the present disclosure, a data storage apparatus may include: a storage including a plurality of planes each composed of a plurality of memory blocks, each of the plurality of planes being divided into a first region where an original of system data and at least one copy of the system data are stored and a second region where user data is stored; and a controller configured to control an operation of the storage and to perform a relief operation of switching a source memory block, in which a selected copy of the system data is stored, to a region replaceable with the second region.

In an embodiment of the present disclosure, an operation method of a data storage apparatus, which includes a storage including a plurality of planes each composed of a plurality of memory blocks, each of the plurality of planes being divided into a first region where an original of system data and a copy of the system data are stored and a second region where user data is stored. The operation method comprises selecting a victim plane; moving the copy of the system data stored in a source memory block of the first region to the second region of the victim plane; and switching the source memory block to a region replaceable with the second region.

In an embodiment of the present disclosure, a nonvolatile memory system may include: a storage including at least two planes each including at least first and second memory blocks, the first memory block being designated as non-accessible for user data and the second memory block being designated as accessible for user data; and a controller suitable for re-designating the first memory block as accessible for user data and reserve the re-designated first memory block for the second memory block, in a selected one of the planes.

BRIEF DESCRIPTION OF THE DRAWINGS

FIG. 2 is a configuration diagram of a nonvolatile memory apparatus in accordance with an embodiment of the present disclosure.

DETAILED DESCRIPTION

Hereinafter, embodiments of the present technology will be described in more detail with reference to the accompanying drawings.

Figure 1:
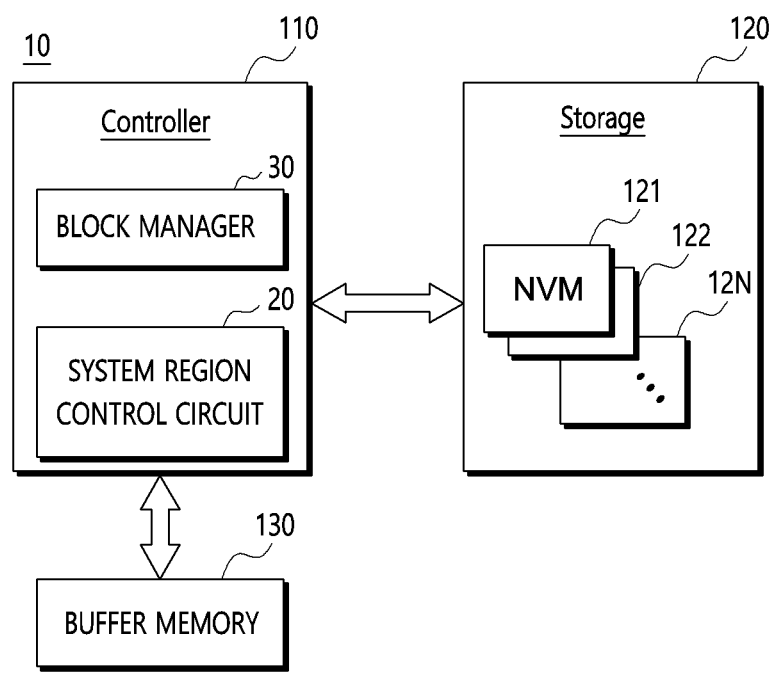
FIG. 1 is a configuration diagram of a data storage apparatus in accordance with an embodiment of the present disclosure.

FIG. 1 is a configuration diagram of a data storage apparatus 10 in accordance with an embodiment of the present disclosure.

Referring to FIG. 1, the data storage apparatus 10 in accordance with an embodiment may include a controller 110, a storage 120, and a buffer memory 130.

The controller 110 may control the storage 120 in response to a request of a host device (not illustrated). For example, the controller 110 may allow data to be programmed in the storage 120 at a write request of the host device. Furthermore, the controller 110 may provide the host device with the data written in the storage 120 in response to a read request of the host device.

The storage 120 may program data or output the programmed data under the control of the controller 110. The storage 120 may include a volatile or nonvolatile memory apparatus. In an embodiment, the storage 120 may be implemented using a memory device selected from various nonvolatile memory devices such as an electrically erasable and programmable ROM (EEPROM), a NAND flash memory, a NOR flash memory, a phase-change RAM (PRAM), a resistive RAM (ReRAM), a ferroelectric RAM (FRAM), and a spin torque transfer magnetic RAM (STT-MRAM).

The storage 120 may include a plurality of nonvolatile memory apparatuses (NVM) 121 to 12N, and each of the nonvolatile memory apparatuses (NVM) 121 to 12N may include a plurality of dies, a plurality of chips, or a plurality of packages. In addition, the storage 120 may configured to operate as a single-level cell (SLC) that stores one-bit data in one memory cell or an extra-level cell (XLC) that stores multi-bit data in one memory cell. An embodiment of the nonvolatile memory apparatuses 121 to 12N constituting the storage 120 will be described below with reference to FIG. 2.

The buffer memory 130 may serve as a space capable of temporarily storing data transmitted/received when the data storage apparatus 10 performs a series of operations such as writing or reading the data in cooperation with the host device. Although FIG. 1 illustrates an example in which the buffer memory 130 is located outside the controller 110, the buffer memory 130 may also be provided inside the controller 110.

Figure 3:
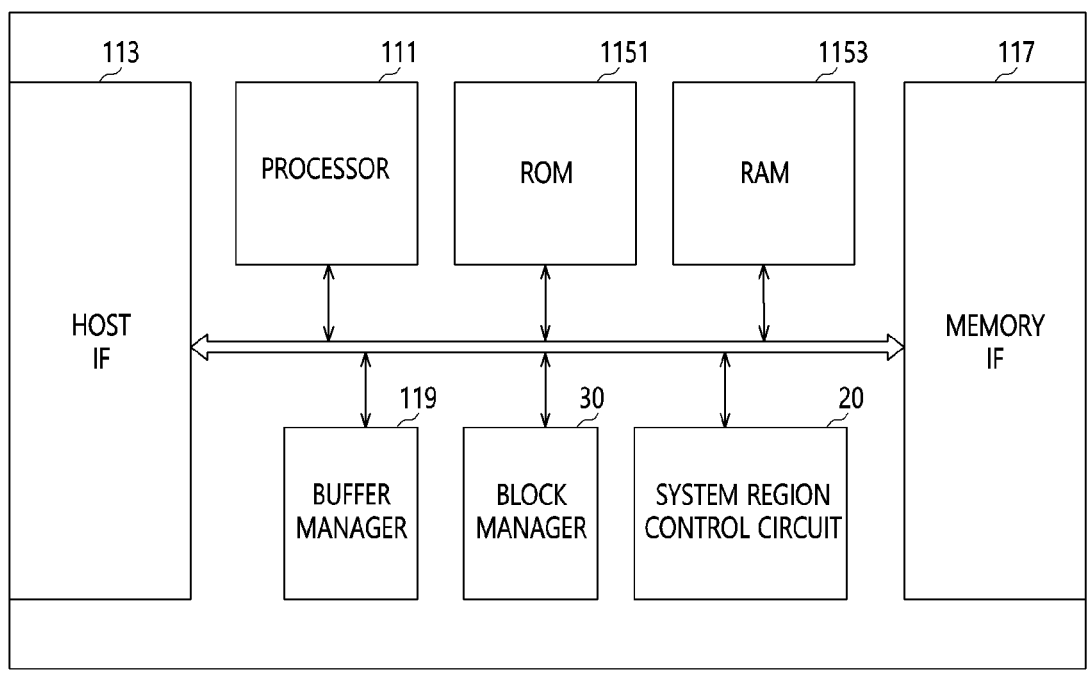
FIG. 3 is a configuration diagram of a controller in accordance with an embodiment of the present disclosure.

The buffer memory 130 may be controlled by a buffer manager (119 in FIG. 3).

The buffer manager may divide the buffer memory 130 into a plurality of regions (slots), and allocate or release each region in order to temporarily store data. The allocation of a region may mean a state in which data is stored in a corresponding region, or a state in which the data stored in the corresponding region is valid. The release of a region may mean a state in which data is not stored in a corresponding region, or a state in which the data stored in the corresponding region is invalidated.

The controller 110 may include a system region control circuit 20 and a block manager 30.

FIG. 2 is a configuration diagram of a nonvolatile memory apparatus 12X in accordance with an embodiment of the present disclosure.

Referring to FIG. 2, the nonvolatile memory apparatus 12X (X is a natural number of 1≤X≤N) may include a plurality of dies D0 and D1. Each of the dies D0 and D1 may include one or more planes P0 and P1, and each of the planes P0 and P1 may be composed of a plurality of memory blocks.

The memory blocks constituting each of the planes P0 and P1 may be divided into a first region 1201 for storing system data, a second region 1203 for storing user data, and a third region 1205 as a reserved region replaceable with the second region 1203.

The first region 1201 may include a source region SR of the system data, a first copy region SR_C1, and a second copy region SR_C2. One or more copy regions may be provided. An original of the system data may be stored in a plurality of blocks SB000, SB010, SB100, and SB110. A first copy of the system data may be stored in a plurality of blocks SB000_C1, SB010_C1, SB100_C1, and SB110_C1. A second copy of the system data may be stored in a plurality of blocks SB000_C2, SB010_C2, SB100_C2, and SB110_C2.

In an embodiment, the system data may include map data related to mapping information between a logical address and a physical address, booting information required for a booting operation of the data storage apparatus 10, setting information used for a firmware (FW) operation performed in the controller 110, and the like; however, the present disclosure is not limited thereto.

The second region 1203 may be managed as a plurality of block groups BG0 to BGN under the control of the controller 110. Each of the block groups BG0 to BGN may be obtained by grouping memory blocks having substantially the same or different address offsets in each of the planes P0 and P1 included in each of the plurality of dies D0 and D1. For example, the first block group BG0 may include a plurality of memory blocks UB000, UB010, UB100, and UB110.

The third region 1205 may be a region for supporting a housekeeping operation for the nonvolatile memory apparatuses (NVM) 121 to 12N, or an over-provisioning region for replacing a bad block generated in the second region 1203. The housekeeping operation may include garbage collection, wear leveling, and the like.

When the nonvolatile memory apparatus 12X operates in units of block groups BG0 to BGN, a bad block generated in a specific plane may be replaced with a memory block included in the third region 1205 in the same plane, so that an operation in units of block groups BG0 to BGN may be continuously supported.

The block manager 30 may manage a use state indicating one among an open block, a closed block, and a free block of each of the plurality of memory blocks, the presence or absence of a bad block, the number of times of access to each memory block, and the like. The block manager 30 may calculate the remaining capacity of the planes P0 and P1, the dies D0 and D1, or the nonvolatile memory apparatus 12X, or the remaining capacity of the second region 1203 and the third region 1205 on the basis of the use state of each of the memory blocks and the presence or absence of the bad block. The block manager 30 may predict the degree of deterioration in the planes P0 and P1, the dies D0 and D1, or the nonvolatile memory apparatus 12X on the basis of the number of times of access to each memory block.

The system region control circuit 20 may receive information on the remaining capacity of the third region 1205 constituting the nonvolatile memory apparatuses 121 to 12N from the block manager 30, and thus control the first region 1201 in response to the received information.

In an embodiment, the system region control circuit 20 may move a copy of system data stored in a source memory block of the first region 1201 to the second region 1203 in a victim plane on the basis of the remaining capacity of the third region 1205 and may replace the source memory block with a part of the third region 1205.

Specifically, when the remaining capacity of the third region 1205 provided from the block manager 30 is detected below a set threshold value, the system region control circuit 20 may move the copy of the system data stored in the first region 1201, particularly, a source memory block of the first copy region SR_C1 or the second copy region SR_C2, to the second region 1203 in a victim plane. The system region control circuit 20 may use the source memory block as a part in the third region 1205.

The system region control circuit 20 may refer to the number of bad blocks and a number of times of access to each plane in order to select a victim plane. The number of times of access to each plane may be obtained from the number of times of access to each memory block managed by the block manager 30. For example, the system region control circuit 20 may select a plane having the minimum number of bad blocks, as a victim plane candidate. When there are a plurality of candidate planes, the system region control circuit 20 may finally select a plane having the minimum of times of access thereto, as a victim plane. By moving the copy of the system data to the plane having the minimum of times of access thereto, it is possible to prevent loss of the system data.

FIG. 3 is a configuration diagram of the controller 110 in accordance with an embodiment of the present disclosure.

Referring to FIG. 3, the controller 110 in accordance with an embodiment of the present disclosure may include a processor 111, a host interface (IF) 113, a ROM 1151, a RAM 1153, a memory interface (IF) 117, the buffer manager 119, the system region control circuit 20, and the block manager 30.

The processor 111 may be configured to transfer various types of control information required for a data read or write operation for the storage 120 to the host IF 113, the RAM 1153, the buffer manager 119, and the memory IF 117. In an embodiment, the processor 111 may operate according to firmware provided for various operations of the data storage apparatus 10. In an embodiment, the processor 111 may perform a function of a flash translation layer (FTL) such as garbage collection, address mapping, and wear leveling for managing the storage 120, a function of detecting and correcting an error of data read from the storage 120, and the like.

The host IF 113 may provide a communication channel for receiving a command and a clock signal from the host device and for controlling data input/output under the control of the processor 111. Particularly, the host IF 113 may provide a physical connection between the host device and the data storage apparatus 10. The host IF 113 may provide interfacing with the data storage apparatus 10 corresponding to a bus format of the host device. The bus format of the host device may include at least one of standard interface protocols such as a secure digital, a universal serial bus (USB), a multi-media card (MMC), an embedded MMC (eMMC), a personal computer memory card international association (PCMCIA), a parallel advanced technology attachment (PATA), a serial advanced technology attachment (SATA), a small computer system interface (SCSI), a serial attached SCSI (SAS), a peripheral component interconnection (PCI), a PCI express (PCI-E), and a universal flash storage (UFS).

The ROM 1151 may store program codes required for the operation of the controller 110, for example, firmware or software, and store code data and the like used by the program codes.

The RAM 1153 may store data required for the operation of the controller 110 or data generated by the controller 110.

The memory IF 117 may provide a communication channel for signal transmission/reception between the controller 110 and the storage 120. The memory IF 117 may write data, which has been temporarily stored in the buffer memory 130, in the storage 120 under the control of the processor 111. Furthermore, the memory IF 117 may transfer data read from the storage 120 to the buffer memory 130 for temporary storage.

The buffer manager 119 may be configured to manage a use state of each buffer memory 130. In an embodiment, the buffer manager 119 may divide the buffer memory 130 into a plurality of regions (slots), and allocate or release each region in order to temporarily store data.

The block manager 30 manage the use state indicating one among an open block, a closed block, and a free block of each of the plurality of memory blocks, the presence or absence of the bad block, the number of times of access to each memory block, and the like. The block manager 30 may check the remaining capacity of the planes P0 and P1, the dies D0 and D1, or the nonvolatile memory apparatus 12X, or the remaining capacity of the second region 1203 and the third region 1205 on the basis of the use state of each of the memory blocks and the presence or absence of the bad block. The block manager 30 may predict the degree of deterioration in the planes P0 and P1, the dies D0 and D1, or the nonvolatile memory apparatus 12X on the basis of the number of times of access to each memory block.

The system region control circuit 20 may receive information on the remaining capacity of the third region 1205 constituting the nonvolatile memory apparatuses 121 to 12N from the block manager 30, and thus control the first region 1201 in response to the received information.

Figure 4:
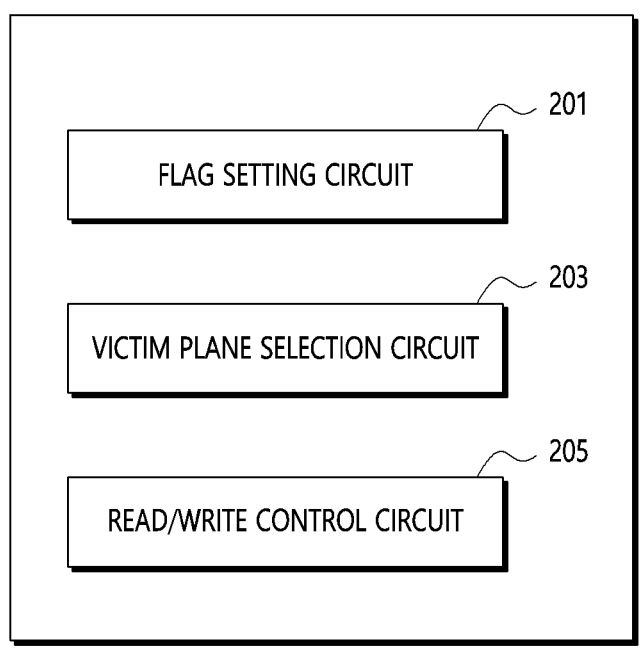
FIG. 4 is a configuration diagram of a system region control circuit accordance with an embodiment of the present disclosure.

FIG. 4 is a configuration diagram of the system region control circuit 20 accordance with an embodiment of the present disclosure.

Referring to FIG. 4, the system region control circuit 20 may include a flag setting circuit 201, a victim plane selection circuit 203, and a read/write control circuit 205. The flag setting circuit 201, the victim plane selection circuit 203, and the read/write control circuit 205 may include all circuits, systems, software, firmware and devices necessary for their respective operations and functions.

The flag setting circuit 201 may receive the remaining capacity of the third region 1205 of each nonvolatile memory apparatus 12X from the block manager 30. When the remaining capacity of the third region 1205 is detected below the set threshold value, the flag setting circuit 201 may set an EOL relief flag for the nonvolatile memory apparatus 12X.

As the EOL relief flag is set, the victim plane selection circuit 203 may select a plane having the minimum number of bad blocks among the planes constituting the nonvolatile memory apparatus 12X, as a victim plane candidate. When there are a plurality of candidate planes, the victim plane selection circuit 203 may finally select a plane having the lowest degree of deterioration, for example, a plane having the minimum number of times of access thereto among the candidate planes, as a victim plane.

The read/write control circuit 205 may move data (the copy of the system data) stored in the first region 1201, particularly, the source memory block of the first copy region SR_C1 or the second copy region SR_C2, to the second region 1203. Then, the read/write control circuit 205 may erase the source memory block.

The erased source memory block may be used as a part in the third region 1205 under the control of the processor 111.

As the source memory block is replaced with a memory block included in the third region 1205, the remaining capacity of the third region 1205 is increased, and the life of the nonvolatile memory apparatus 12X is extended. Accordingly, the nonvolatile memory apparatus 12X becomes capable of storing data. Thereafter, when a runtime bad block additionally generated in the nonvolatile memory apparatus 12X is replaced with a memory block included in the third region 1205, the remaining capacity of the third region 1205 reaches a threshold value again. In such a case, since the EOL relief flag has already been set to the nonvolatile memory apparatus 12X, the system region control circuit 20 may determine that it is difficult to further extend the life of the nonvolatile memory apparatus 12X and operate the nonvolatile memory apparatus 12X in a read mode.

In an embodiment, when the remaining capacity of the third region 1205 is detected to be below a set first threshold value in the nonvolatile memory apparatus 12X, the system region control circuit 20 may move a copy of system data stored in a first source memory block of the first copy region SR_C1 to a first victim plane and replace the first source memory block as a part in the third region 1205, thereby securing the capacity of the third region 1205 of the nonvolatile memory apparatus 12X. Then, when the remaining capacity of the third region 1205 reaches a second threshold value equal to or less than the first threshold value in the nonvolatile memory apparatus 12X, the system region control circuit 20 may set the EOL relief flag to the nonvolatile memory apparatus 12X. Then, the system region control circuit 20 may move a copy of system data stored in a second source memory block of the second copy region SR_C2 to a second victim plane and replace the second source memory block as a part in the third region 1205, thereby securing the capacity of the third region 1205 of the nonvolatile memory apparatus 12X. As the capacity of the third region 1205 is secured again, the nonvolatile memory apparatus 12X becomes capable of storing data. Thereafter, when a runtime bad block additionally generated in the nonvolatile memory apparatus 12X is replaced with a memory block included in the third region 1205, the remaining capacity of the third region 1205 reaches the first threshold value or the second threshold value again. In such a case, since the EOL relief flag has already been set to the nonvolatile memory apparatus 12X, the system region control circuit 20 may determine that it is difficult to further extend the life of the nonvolatile memory apparatus 12X and operate the nonvolatile memory apparatus 12X in a read-only mode.

Figure 5:
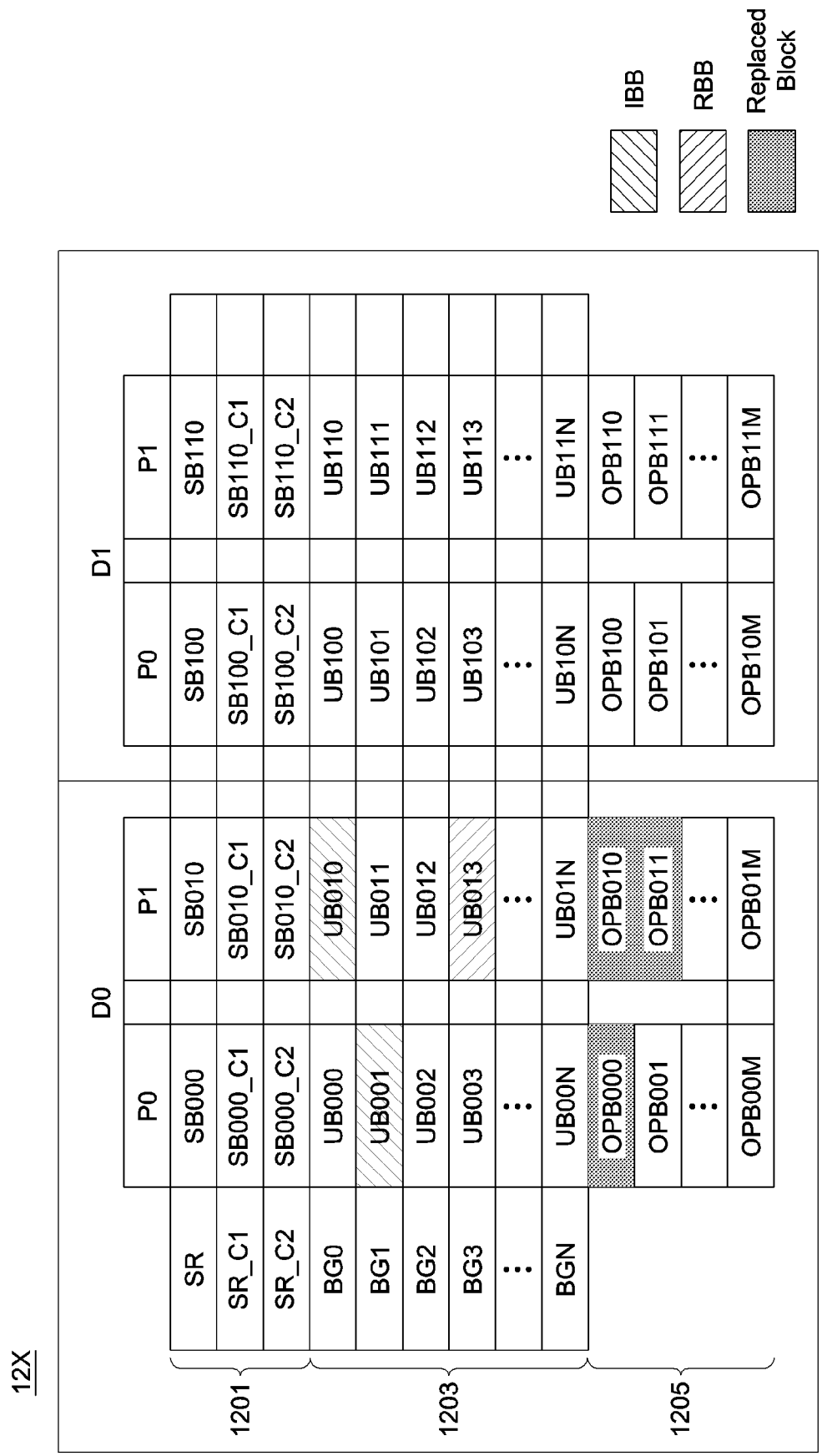
FIG. 5 to FIG. 7 are conceptual diagrams for describing an operation of the system region control circuit in accordance with an embodiment of the present disclosure.
Figure 6:
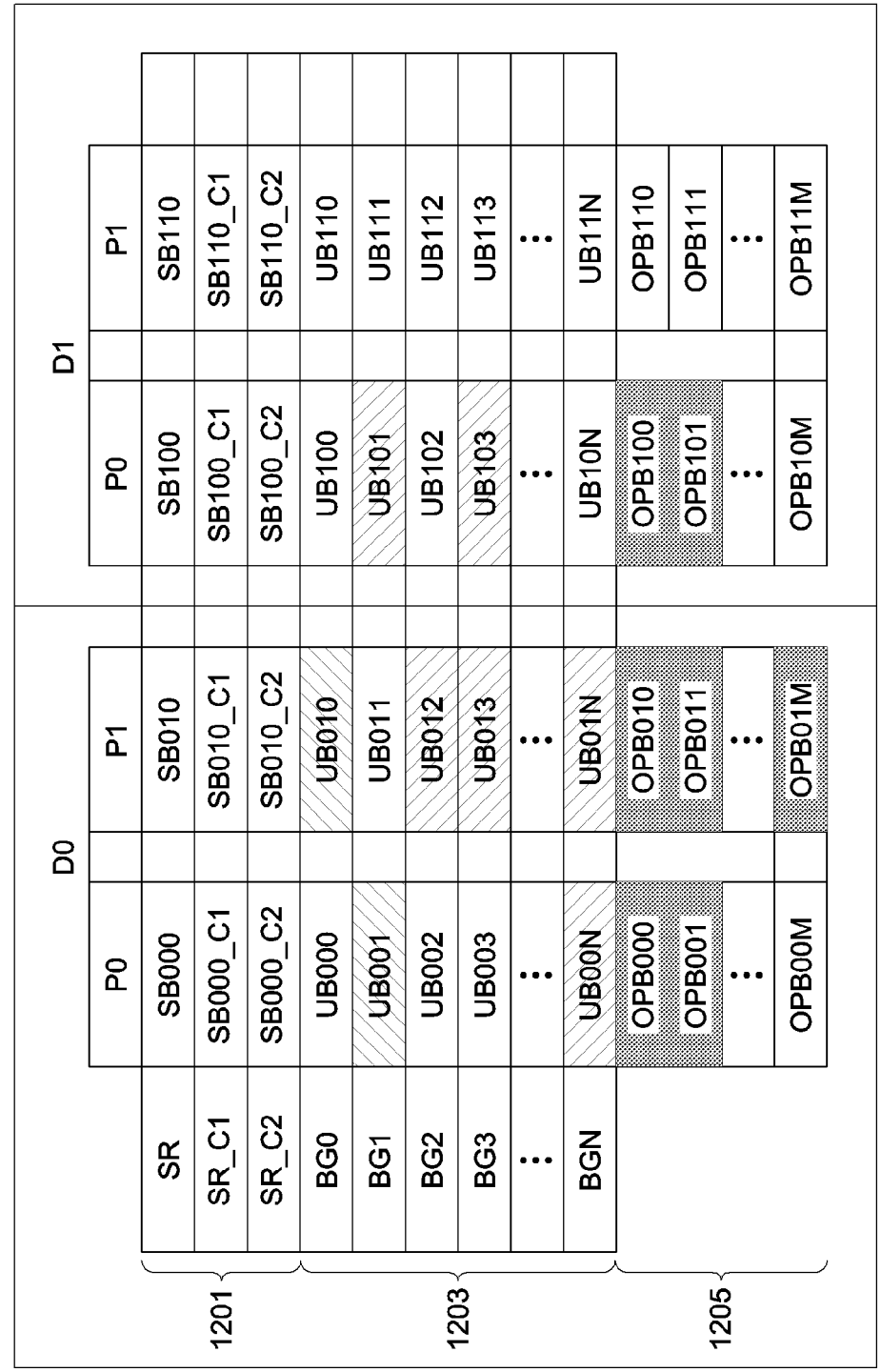
Figure 7:
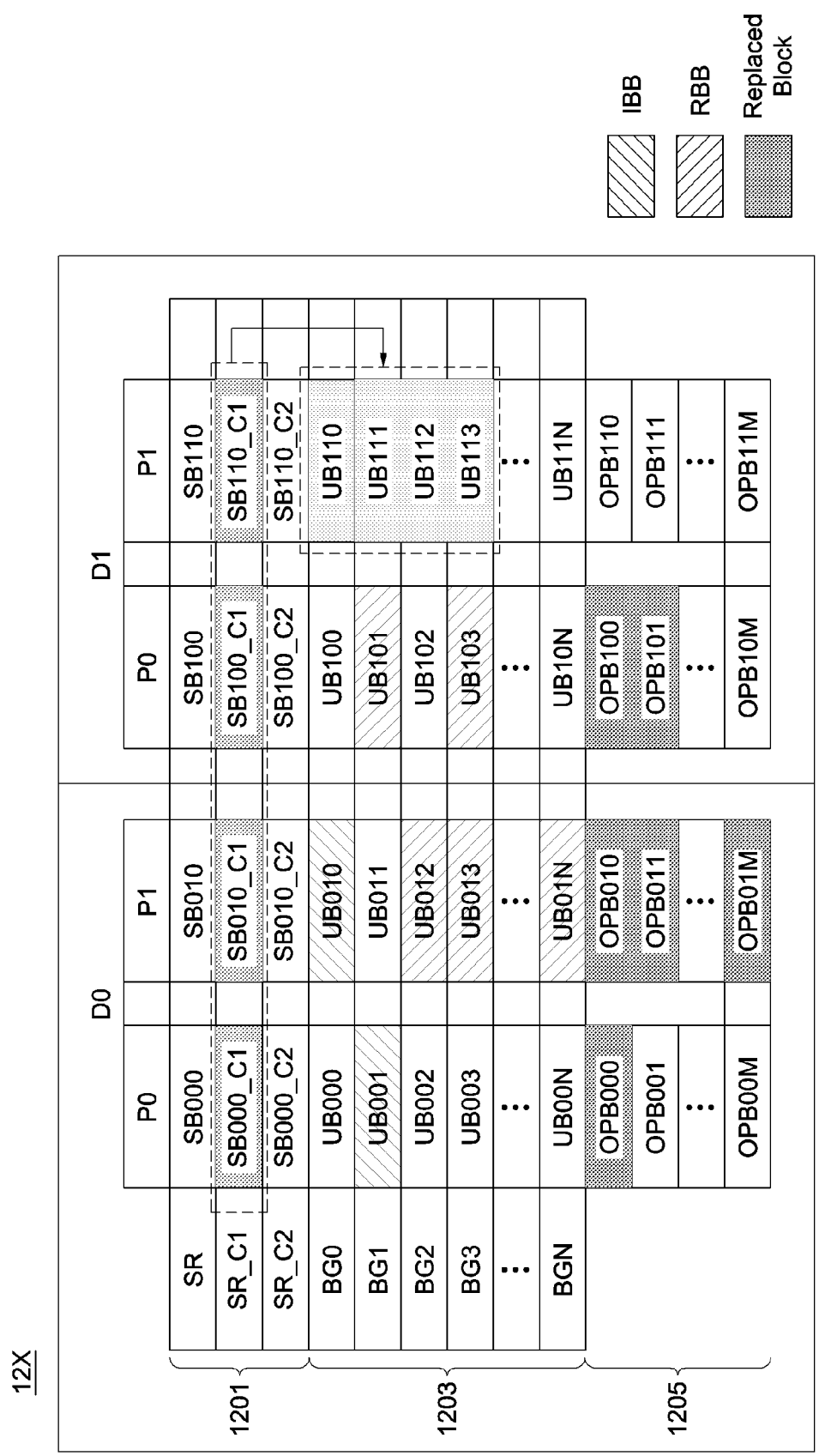

FIG. 5 to FIG. 7 are conceptual diagrams for describing an operation of the system region control circuit 20 in accordance with an embodiment of the present disclosure.

Referring to FIG. 5, the nonvolatile memory apparatus 12X may include an initial bad block IBB included from the time of production and a runtime bad block RBB generated during use.

The IBB and/or RBB may be replaced with a memory block included in the third region 1205. For example, the RBB (UB001) included in the $0^{th}$ plane P0 of the $0^{th}$ die D0 may be replaced with OPB000 of the third region 1205. The RBB (UB010) and IBB (UB013) included in the first plane P1 of the $0^{th}$ die D0 may be replaced with OPB010 and OPB011 of the third region 1205.

As the nonvolatile memory apparatus 12X is continuously used, the RBB is continuously increased and the capacity of the third region 1205 for replacing the RBB is decreased as illustrated in FIG. 6.

When the remaining capacity of the third region 1205 falls below a set threshold value in the nonvolatile memory apparatus 12X, the system region control circuit 20 may set the EOL relief flag to the nonvolatile memory apparatus 12X and perform a relief operation of replacing the system data copy region with the second region 1203, that is, a user region.

To this end, the system region control circuit 20 may select a victim plane having the minimum number of bad blocks in the nonvolatile memory apparatus 12X. Referring to FIG. 7, the first plane P1 of the first die D1 may be selected as a victim plane.

Furthermore, the system region control circuit 20 may move, to the victim plane P1 of the first die D1, first copy of system data stored in the memory blocks SB000_C1, SB001_C1, SB100_C1, and SB110_C1 included in, for example, the first copy region SR_C1 in the first region 1201.

Furthermore, the system region control circuit 20 may control the memory blocks SB000_C1, SB001_C1, SB100_C1, and SB110_C1 to be erased and used as a part in the third region 1205.

Figure 8:
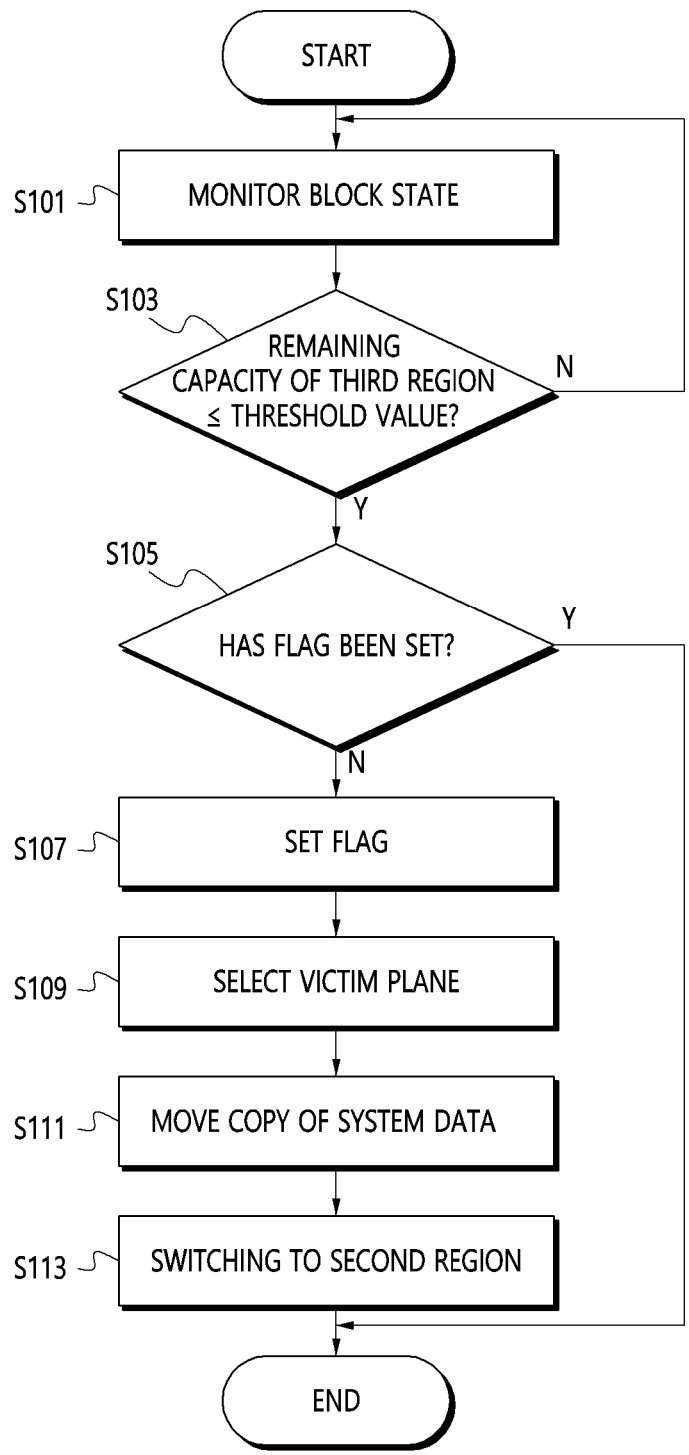
FIG. 8 is a flowchart for describing an operation method of the data storage apparatus in accordance with an embodiment of the present disclosure.

FIG. 8 is a flowchart for describing an operation method of the data storage apparatus 10 in accordance with an embodiment of the present disclosure, for example, a relief operation.

Referring to FIG. 8, the controller 110 of the data storage apparatus 10 may monitor the use state indicating one among an open block, a closed block, and a free block of each memory block constituting the nonvolatile memory apparatus 12X, the presence or absence of the bad block, the number of times of access to each memory block, and the like (S101). As the block state is monitored, the controller 110 may calculate the remaining capacity of the third region 1205 constituting the nonvolatile memory apparatus 12X and predict the degree of deterioration in each plane in the nonvolatile memory apparatus 12X.

When the remaining capacity of the third region 1205 is detected equal to or below the set threshold value, for example, the first threshold value (S103: Y), the controller 110 may check whether the EOL relief flag has been set to the nonvolatile memory apparatus 12X (S105). When the remaining capacity of the third region 1205 is greater than the threshold value (S103: N), the controller 110 may continuously monitor the block state (S101).

When the EOL relief flag has not been set to the nonvolatile memory apparatus 12X (S105: Y), the controller 110 may set the EOL relief flag (S107) and select a victim plane among the planes constituting the nonvolatile memory apparatus 12X (S109). In an embodiment, the controller 110 may select a plane having the minimum number of bad blocks, as a victim plane candidate in the nonvolatile memory apparatus 12X. When there are a plurality of candidate planes in the nonvolatile memory apparatus 12X, the controller 110 may finally select a plane having the lowest degree of deterioration, for example, a plane having the minimum number of times of access thereto, as a victim plane in the nonvolatile memory apparatus 12X.

Then, the controller 110 may move the copy of the system data stored in the source memory block of the first copy region SR_C1 or the second copy region SR_C2 to the second region 1203 of the victim plane (S111). When the victim plane is selected (S109), the plane having the minimum number of times of access thereto, may be selected, so that it is possible to safely store the copy of the system data.

After moving the copy of the system data, the controller 110 may erase the source memory block and switch the source memory block to a part in the third region 1205 (S113).

As the source memory block is replaced with a memory block included in the third region 1205, the remaining capacity of the third region 1205 is increased, and the life of the nonvolatile memory apparatus 12X is extended. Accordingly, the nonvolatile memory apparatus 12X becomes capable of storing data. Thereafter, when a runtime bad block additionally generated in the nonvolatile memory apparatus 12X is replaced with a memory block included in the third region 1205, the remaining capacity of the third region 1205 reaches a threshold value again. In such a case, since the EOL relief flag has already been set to the nonvolatile memory apparatus 12X (S105: Y), the controller 110 may determine that it is difficult to further extend the life of the nonvolatile memory apparatus 12X, end the relief operation, and operate the nonvolatile memory apparatus 12X in the read mode.

Figure 9:
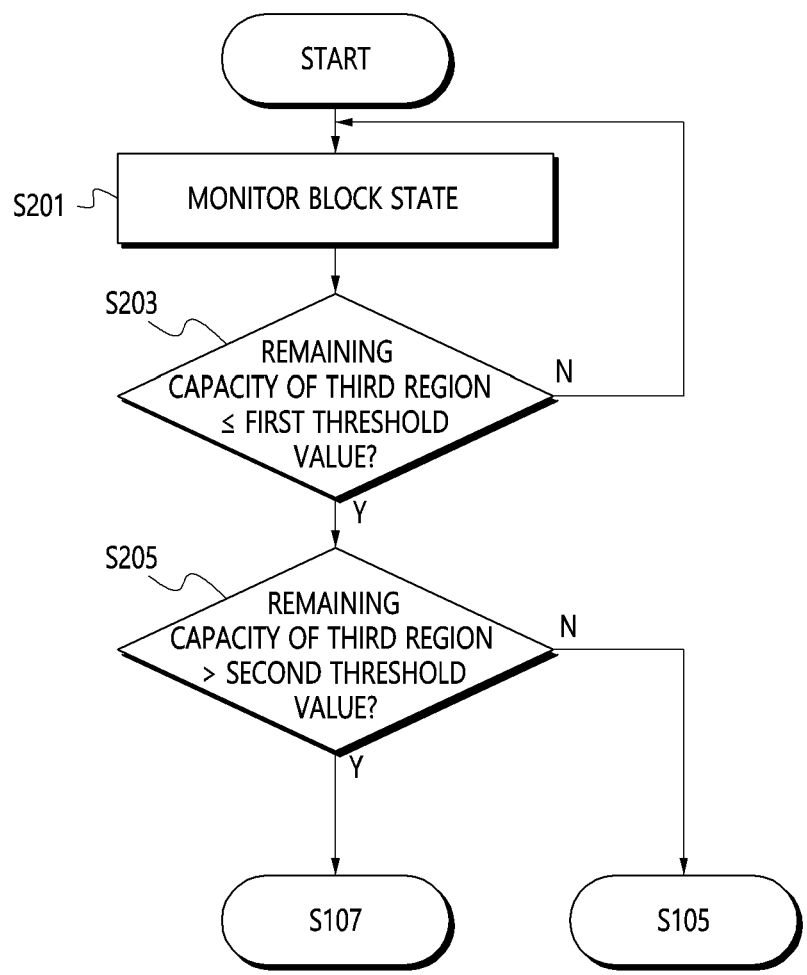
FIG. 9 is a flowchart for describing an operation method of the data storage apparatus in accordance with an embodiment of the present disclosure.

FIG. 9 is a flowchart for describing an operation method of the data storage apparatus 10 in accordance with an embodiment of the present disclosure, for example, a relief operation.

Referring to FIG. 9, the controller 110 of the data storage apparatus 10 may monitor the use state indicating one among an open block, a closed block, and a free block of each memory block constituting the nonvolatile memory apparatus 12X, the presence or absence of the bad block, the number of times of access to each memory block, and the like (S201). As the block state is monitored, the controller 110 may calculate the remaining capacity of the third region 1205 constituting the nonvolatile memory apparatus 12X and predict the degree of deterioration in each plane of the nonvolatile memory apparatus 12X.

When the remaining capacity of the third region 1205 is detected equal to or below the set first threshold value (S203: Y), the controller 110 may check whether the remaining capacity of the third region 1205 is greater than the second threshold value set to a value equal to or less than the first threshold value (S205).

When the remaining capacity of the third region 1205 is greater than the first threshold value (S203: N), the controller 110 may continuously monitor the block state (S201).

When the remaining capacity of the third region 1205 is equal to or less than the first threshold value and is greater than the second threshold value (S205: Y), the controller 110 may proceed to operation S107 of FIG. 8 and perform a first relief operation. In the first relief operation, the controller 110 may move the copy of the system data stored in the source memory block included in, for example, the first copy region SR_C1 to the second region 1203 of the victim plane.

Moreover, when the remaining capacity of the third region 1205 is equal to or less than the second threshold value (S205: N), the controller 110 may proceed to operation S105 of FIG. 8 and perform EOL relief flag setting and a second relief operation. In the second relief operation, the controller 110 may move the copy of the system data stored in the source memory block included in, for example, the second copy region SR_C2 to the second region 1203 of the victim plane.

In accordance with the present technology, before the remaining capacity of a reserved region for replacing a user data storage space is reduced to a threshold value or less and thus the data storage apparatus is switched to the read-only mode, the copy storage region of system data is switched to a part in the reserved region, so that it is possible to extend the life of the data storage apparatus.

In an embodiment, when the remaining capacity of the third region is detected below the first threshold value or the second threshold value and the EOL relief flag has been set, the controller 110 can delete the copy of the system data and switch a corresponding region to the second region or the third region.

Furthermore, the relief operation of the data storage apparatus 10 can be controlled to be triggered according to a preset specific event without being triggered by the remaining capacity of the third region.

Figure 10:
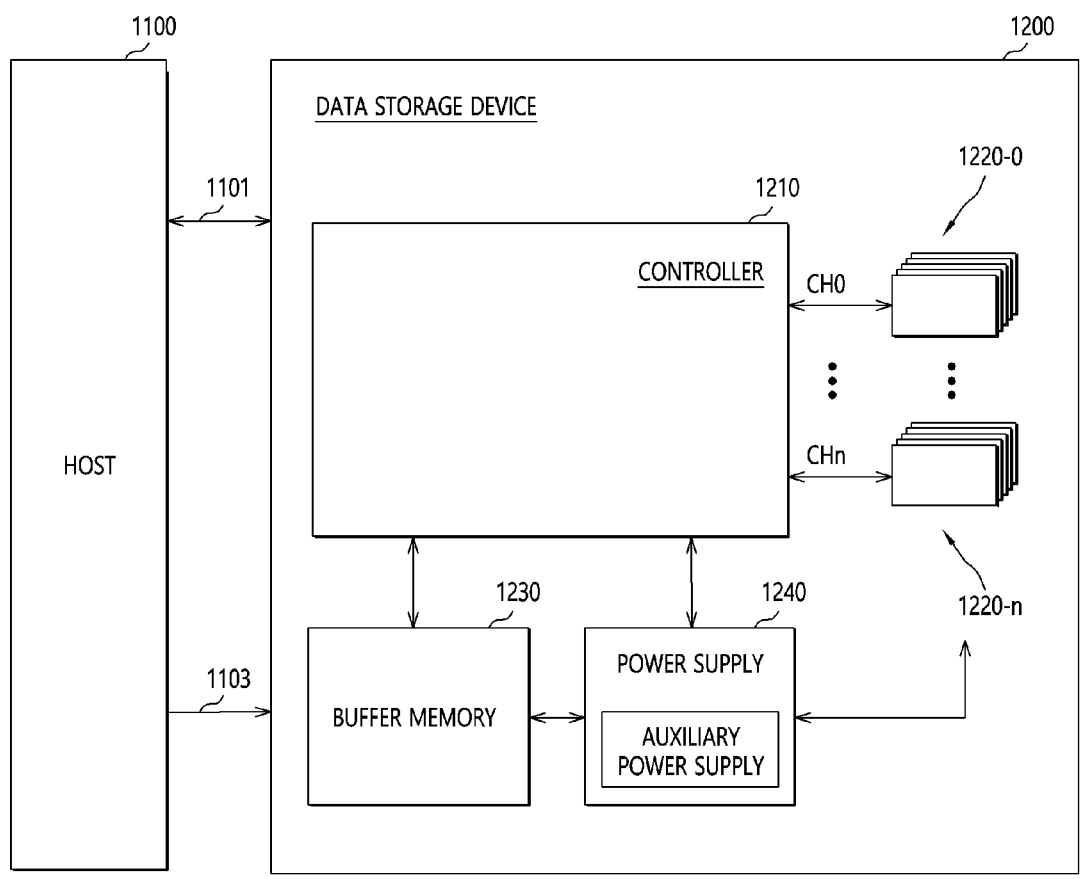
FIG. 10 is a diagram illustrating a data storage system in accordance with an embodiment of the present disclosure.

FIG. 10 is a diagram illustrating a data storage system 1000, in accordance with an embodiment of the present disclosure.

Referring to FIG. 10, the data storage 1000 may include a host device 1100 and the data storage device 1200. In an embodiment, the data storage device 1200 may be configured as a solid state drive (SSD).

The data storage device 1200 may include a controller 1210, a plurality of nonvolatile memory devices 1220-0 to 1220-*n*, a buffer memory device 1230, a power supply 1240, a signal connector 1101, and a power connector 1103.

The controller 1210 may control general operations of the data storage device 1200. The controller 1210 may include a host interface unit, a control unit, a random access memory used as a working memory, an error correction code (ECC) unit, and a memory interface unit. In an embodiment, the controller 1210 may configured as controller 110 shown in FIGS. 1 and 2.

The host device 1100 may exchange a signal with the data storage device 1200 through the signal connector 1101. The signal may include a command, an address, data, and so forth.

The controller 1210 may analyze and process the signal received from the host device 1100. The controller 1210 may control operations of internal function blocks according to firmware or software for driving the data storage device 1200.

The buffer memory device 1230 may temporarily store data to be stored in at least one of the nonvolatile memory devices 1220-0 to 1220-*n*. Further, the buffer memory device 1230 may temporarily store the data read from at least one of the nonvolatile memory devices 1220-0 to 1220-*n*. The data temporarily stored in the buffer memory device 1230 may be transmitted to the host device 1100 or at least one of the nonvolatile memory devices 1220-0 to 1220-*n* according to control of the controller 1210.

The nonvolatile memory devices 1220-0 to 1220-*n* may be used as storage media of the data storage device 1200. The nonvolatile memory devices 1220-0 to 1220-*n* may be coupled with the controller 1210 through a plurality of channels CH0 to CHn, respectively. One or more nonvolatile memory devices may be coupled to one channel. The nonvolatile memory devices coupled to each channel may be coupled to the same signal bus and data bus.

The power supply 1240 may provide power inputted through the power connector 1103 to the controller 1210, the nonvolatile memory devices 1220-0 to 1220-*n* and the buffer memory device 1230 of the data storage device 1200. The power supply 1240 may include an auxiliary power supply. The auxiliary power supply may supply power to allow the data storage device 1200 to be normally terminated when a sudden power interruption occurs. The auxiliary power supply may include bulk-capacity capacitors sufficient to store the needed charge.

The signal connector 1101 may be configured as one or more of various types of connectors depending on an interface scheme between the host device 1100 and the data storage device 1200.

The power connector 1103 may be configured as one or more of various types of connectors depending on a power supply scheme of the host device 1100.

Figure 11:
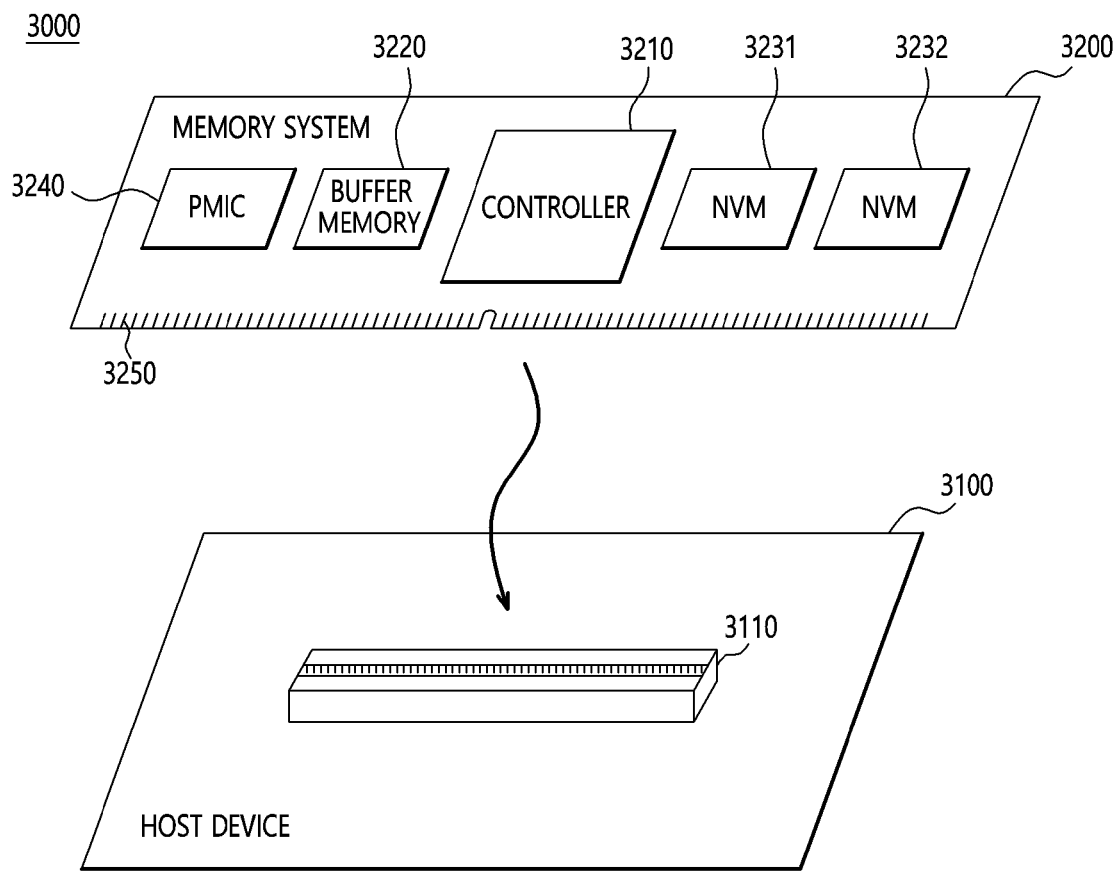
FIG. 11 and FIG. 12 are diagrams illustrating a data processing system in accordance with an embodiment of the present disclosure.

FIG. 11 is a diagram illustrating a data processing system 3000, in accordance with an embodiment of the present disclosure. Referring to FIG. 11, the data processing system 3000 may include a host device 3100 and a memory system 3200.

The host device 3100 may be configured in the form of a board, such as a printed circuit board. Although not shown, the host device 3100 may include internal function blocks for performing the function of a host device.

The host device 3100 may include a connection terminal 3110, such as a socket, a slot, or a connector. The memory system 3200 may be mated to the connection terminal 3110.

The memory system 3200 may be configured in the form of a board, such as a printed circuit board. The memory system 3200 may be referred to as a memory module or a memory card. The memory system 3200 may include a controller 3210, a buffer memory device 3220, nonvolatile memory devices 3231 and 3232, a power management integrated circuit (PMIC) 3240, and a connection terminal 3250.

The controller 3210 may control general operations of the memory system 3200. The controller 3210 may be configured in the same manner as the controller 110 shown in FIGS. 1 and 2.

The buffer memory device 3220 may temporarily store data to be stored in the nonvolatile memory devices 3231 and 3232. Further, the buffer memory device 3220 may temporarily store data read from the nonvolatile memory devices 3231 and 3232. The data temporarily stored in the buffer memory device 3220 may be transmitted to the host device 3100 or the nonvolatile memory devices 3231 and 3232 according to control of the controller 3210.

The nonvolatile memory devices 3231 and 3232 may be used as storage media of the memory system 3200.

The PMIC 3240 may provide the power inputted through the connection terminal 3250 to the inside of the memory system 3200. The PMIC 3240 may manage the power of the memory system 3200 according to control of the controller 3210.

The connection terminal 3250 may be coupled to the connection terminal 3110 of the host device 3100. Through the connection terminal 3250, signals such as commands, addresses, data, and so forth, and power may be transferred between the host device 3100 and the memory system 3200. The connection terminal 3250 may be configured as one or more of various types depending on an interface scheme between the host device 3100 and the memory system 3200. The connection terminal 3250 may be disposed on a side of the memory system 3200, as shown.

Figure 12:
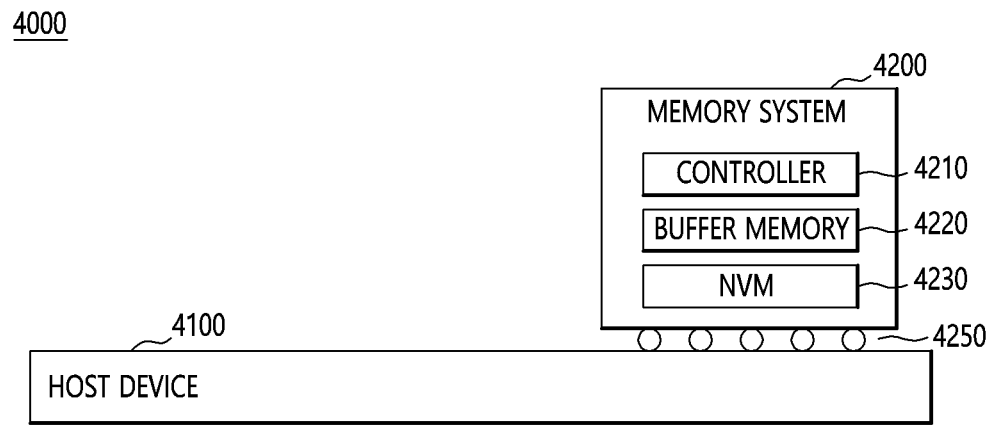

FIG. 12 is a diagram illustrating a data processing system 4000 in accordance with an embodiment of the present disclosure. Referring to FIG. 12, the data processing system 4000 may include a host device 4100 and a memory system 4200.

The host device 4100 may be configured in the form of a board, such as a printed circuit board. Although not shown, the host device 4100 may include internal function blocks for performing the function of a host device.

The memory system 4200 may be configured in the form of a surface-mounted type package. The memory system 4200 may be mounted to the host device 4100 through solder balls 4250. The memory system 4200 may include a controller 4210, a buffer memory device 4220, and a nonvolatile memory device 4230.

The controller 4210 may control general operations of the memory system 4200. The controller 4210 may be configured in the same manner as the controller 110 shown in FIGS. 1 and 2.

The buffer memory device 4220 may temporarily store data to be stored in the nonvolatile memory device 4230. Further, the buffer memory device 4220 may temporarily store data read from the nonvolatile memory device 4230. The data temporarily stored in the buffer memory device 4220 may be transmitted to the host device 4100 or the nonvolatile memory device 4230 according to control of the controller 4210.

The nonvolatile memory device 4230 may be used as the storage medium of the memory system 4200.

Figure 13:
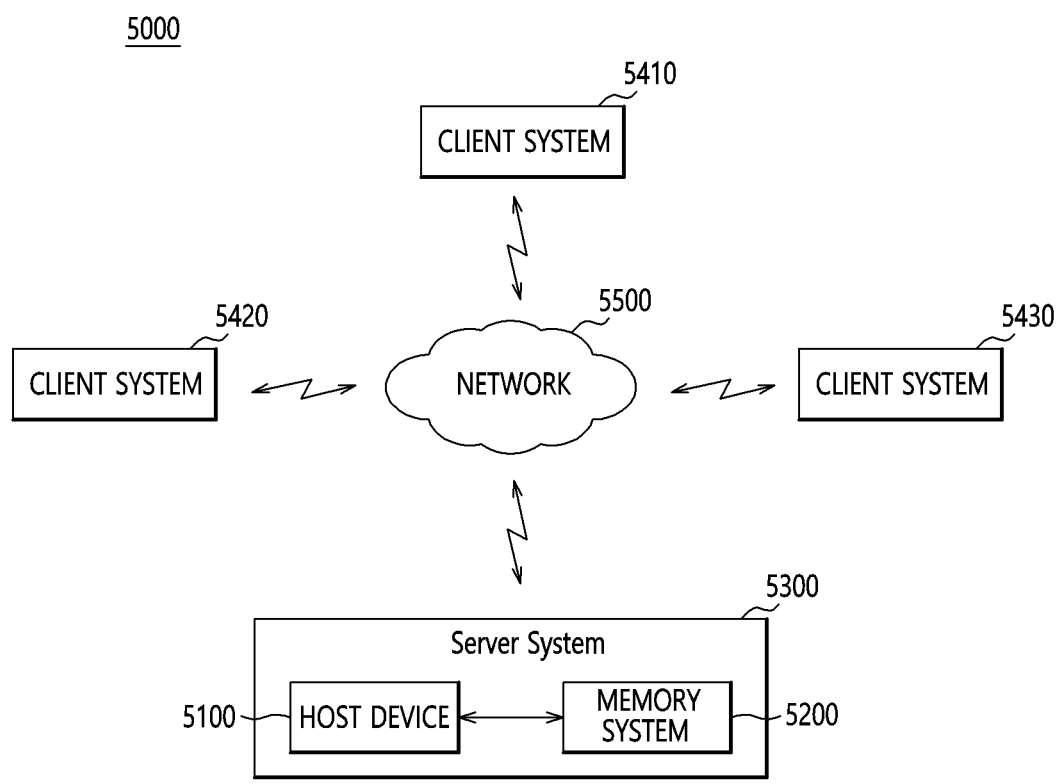
FIG. 13 is a diagram illustrating a network system including a data storage device in accordance with an embodiment of the present disclosure.

FIG. 13 is a diagram illustrating a network system 5000 including a data storage device, in accordance with an embodiment of the present disclosure. Referring to FIG. 13, the network system 5000 may include a server system 5300 and a plurality of client systems 5410, 5420, and 5430, which are coupled through a network 5500.

The server system 5300 may service data in response to requests from the plurality of client systems 5410 to 5430. For example, the server system 5300 may store the data provided by the plurality of client systems 5410 to 5430. For another example, the server system 5300 may provide data to the plurality of client systems 5410 to 5430.

The server system 5300 may include a host device 5100 and a memory system 5200. The memory system 5200 may be configured as the memory system 10 shown in FIG. 1, the data storage device 1200 shown in FIG. 10, the memory system 3200 shown in FIG. 11, or the memory system 4200 shown in FIG. 12.

Figure 14:
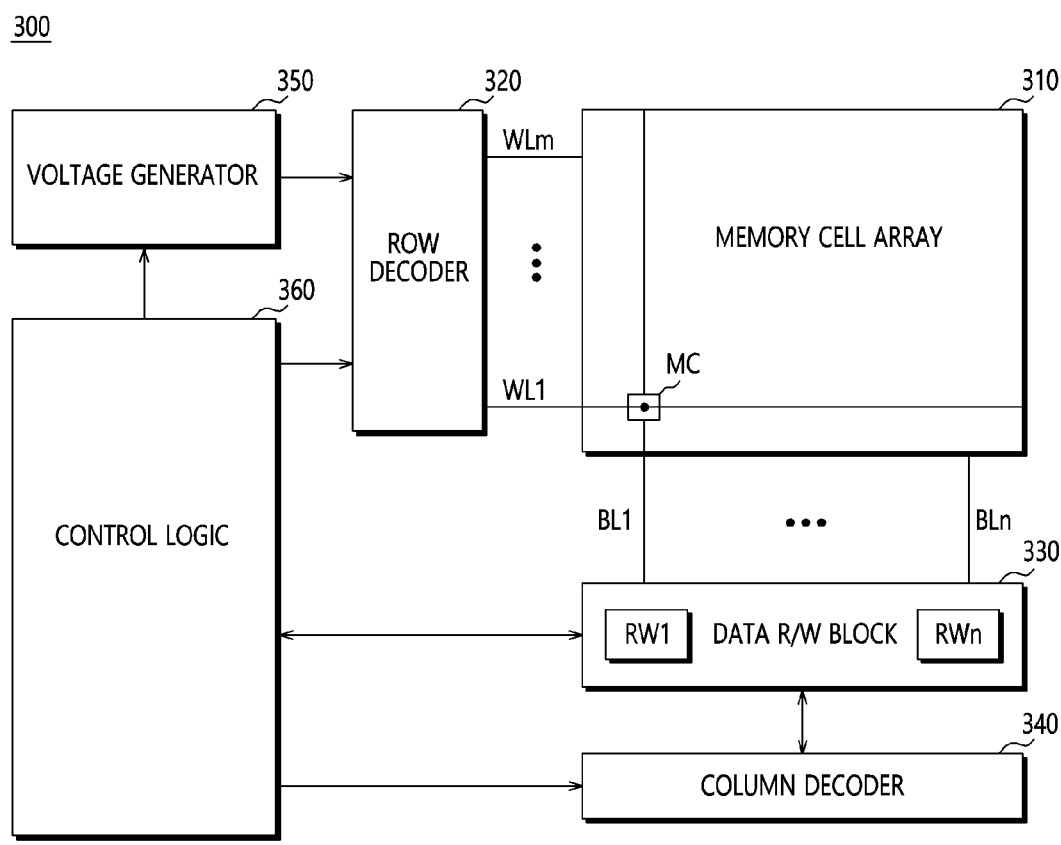
FIG. 14 is a block diagram illustrating a nonvolatile memory device included in a data storage device in accordance with an embodiment of the present disclosure.

FIG. 14 is a block diagram illustrating a nonvolatile memory device 300 included in a data storage device, such as the data storage device 10, in accordance with an embodiment of the present disclosure. Referring to FIG. 14, the nonvolatile memory device 300 may include a memory cell array 310, a row decoder 320, a data read/write block 330, a column decoder 340, a voltage generator 350, and a control logic 360.

The memory cell array 310 may include memory cells MC which are arranged at areas where word lines WL1 to WLm and bit lines BL1 to BLn intersect with each other.

The memory cell array 310 may comprise a three-dimensional memory array. The three-dimensional memory array, for example, has a stacked structure in a perpendicular direction to the flat surface of a semiconductor substrate. Moreover, the three-dimensional memory array means a structure including NAND strings which memory cells comprised in NAND strings are stacked perpendicular to the flat surface of a semiconductor substrate.

The structure of the three-dimensional memory array is not limited to the embodiment indicated above. The memory array structure can be formed in a highly integrated manner with horizontal directionality as well as vertical directionality. In an embodiment, the NAND strings of the three-dimensional memory array memory cells are arranged in the horizontal and vertical directions with respect to the surface of the semiconductor substrate. The memory cells may be variously spaced to provide different degrees of integration.

The row decoder 320 may be coupled with the memory cell array 310 through the word lines WL1 to WLm. The row decoder 320 may operate according to control of the control logic 360. The row decoder 320 may decode an address provided by an external device (not shown). The row decoder 320 may select and drive the word lines WL1 to WLm, based on a decoding result. For instance, the row decoder 320 may provide a word line voltage, provided by the voltage generator 350, to the word lines WL1 to WLm.

The data read/write block 330 may be coupled with the memory cell array 310 through the bit lines BL1 to BLn. The data read/write block 330 may include read/write circuits RW1 to RWn, respectively, corresponding to the bit lines BL1 to BLn. The data read/write block 330 may operate according to control of the control logic 360. The data read/write block 330 may operate as a write driver or a sense amplifier, according to an operation mode. For example, the data read/write block 330 may operate as a write driver, which stores data provided by the external device in the memory cell array 310 in a write operation. For another example, the data read/write block 330 may operate as a sense amplifier, which reads out data from the memory cell array 310 in a read operation.

The column decoder 340 may operate according to control of the control logic 360. The column decoder 340 may decode an address provided by the external device. The column decoder 340 may couple the read/write circuits RW1 to RWn of the data read/write block 330, respectively corresponding to the bit lines BL1 to BLn, with data input/output lines or data input/output buffers, based on a decoding result.

The voltage generator 350 may generate voltages to be used in internal operations of the nonvolatile memory device 300. The voltages generated by the voltage generator 350 may be applied to the memory cells of the memory cell array 310. For example, a program voltage generated in a program operation may be applied to a word line of memory cells for which the program operation is to be performed. For another example, an erase voltage generated in an erase operation may be applied to a well area of memory cells for which the erase operation is to be performed. For still another example, a read voltage generated in a read operation may be applied to a word line of memory cells for which the read operation is to be performed.

The control logic 360 may control general operations of the nonvolatile memory device 300, based on control signals provided by the external device. For example, the control logic 360 may control operations of the nonvolatile memory device 300 such as read, write, and erase operations of the nonvolatile memory device 300.

While various embodiments have been described above, it will be understood to those skilled in the art that the embodiments described are examples only. Accordingly, the data storage apparatus and the operation method thereof described herein should not be limited based on the described embodiments.

The above described embodiments of the present invention are intended to illustrate and not to limit the present invention. Various alternatives and equivalents are possible. The invention is not limited by the embodiments described herein. Nor is the invention limited to any specific type of data storage apparatus. Other additions, subtractions, or modifications which are apparent in view of the present disclosure are intended to fall within the scope of the appended claims.

What is claimed is:

1. A data storage apparatus comprising:
   a storage including a plurality of planes each composed of a plurality of memory blocks, each of the plurality of planes being divided into a first region where an original of system data and a copy of the system data are stored and a second region where user data is stored; and
   a controller configured to control an operation of the storage and to perform a relief operation of moving the copy of the system data stored in a source memory block of the first region to the second region of a victim plane and switching the source memory block to a region replaceable with the second region.

2. The data storage apparatus according to claim 1, wherein the controller is further configured to select, as the victim plane, a plane having the minimum number of bad blocks among the plurality of planes.

3. The data storage apparatus according to claim 2, wherein, when a plurality of planes having the minimum number of bad blocks are detected, the controller is further configured to select, as the victim plane, a plane having the minimum number of times of access thereto among the detected planes.

4. The data storage apparatus according to claim 1,
   wherein the storage further includes a third region replaceable with the second region,
   wherein the controller is further configured to set an end of life (EOL) relief flag as the relief operation is performed, and
   wherein the controller performs the relief operation when a remaining capacity of the third region is equal to or less than a set threshold value and the EOL relief flag has not been set.

5. The data storage apparatus according to claim 1,
   wherein the storage further includes a third region replaceable with the second region, the first region includes a first copy region where a first copy of the system data is stored and a second copy region where a second copy thereof is stored, and
   wherein the relief operation includes a first relief operation of moving the first copy stored in a first source memory block of the first copy region to the second region of a first victim plane when a remaining capacity of the third region is equal to or less than a first threshold value and is greater than a second threshold value less than the first threshold value.

6. The data storage apparatus according to claim 5, wherein the relief operation further includes a second relief operation of moving the second copy stored in a second source memory block of the second copy region to the second region of a second victim plane when the remaining capacity of the third region is equal to or less than the second threshold value.

7. The data storage apparatus according to claim 6,
   wherein the controller is further configured to set an end of life (EOL) relief flag as the second relief operation is performed, and
   wherein the controller performs the first relief operation or the second relief operation when the remaining capacity of the third region is equal to or less than the first threshold value or the second threshold value and the EOL relief flag has not been set.

8. The data storage apparatus according to claim 1, wherein the controller is further configured to maintain the original of the system data in the first region.

9. The data storage apparatus according to claim 1,
   wherein the storage further includes a third region replaceable with the second region, and
   wherein the controller performs the relief operation on the basis of a remaining capacity of the third region.

10. A data storage apparatus comprising:
    a storage including a plurality of planes each composed of a plurality of memory blocks, each of the plurality of planes being divided into a first region where an original of system data and at least one copy of the system data are stored and a second region where user data is stored; and a controller configured to control an operation of the storage and to perform a relief operation of switching a source memory block, in which a selected copy of the system data is stored, to a region replaceable with the second region.

11. The data storage apparatus according to claim 10, wherein the controller is further configured to move the selected copy of the system data to the second region of a victim plane selected from the plurality of planes.

12. The data storage apparatus according to claim 11,
wherein the storage further includes a third region replaceable with the second region, and
wherein the controller is configured to maintain or delete the selected copy of the system data, which is moved to the victim plane, from the first region on the basis of a remaining capacity of the third region.

13. The data storage apparatus according to claim 11,
wherein the storage further includes a third region replaceable with the second region, and
wherein the controller performs the relief operation on the basis of a remaining capacity of the third region.

14. An operation method of a data storage apparatus including a storage including a plurality of planes each composed of a plurality of memory blocks, each of the plurality of planes being divided into a first region where an original of system data and a copy of the system data are stored and a second region where user data is stored, the operation method comprising:
selecting a victim plane;
moving the copy of the system data stored in a source memory block of the first region to the second region of the victim plane; and
switching the source memory block to a region replaceable with the second region.

15. The operation method according to claim 14, wherein the selecting the victim plane comprises selecting, as the victim plane, a plane having the minimum number of bad blocks among the plurality of planes.

16. The operation method according to claim 15, wherein the selecting the victim plane further comprises selecting, as the victim plane, a plane having the minimum number of times of access thereto among a plurality of planes detected to have the minimum number of bad blocks.

17. The operation method according to claim 14,
wherein the storage further includes a third region replaceable with the second region, further comprising:
checking whether an end of life (EOL) relief flag has been set when a remaining capacity of the third region is equal to or less than a set threshold value;
setting the EOL relief flag when the EOL relief flag has not been set; and
operating the storage in a read-only mode when the EOL relief flag has been set, and
wherein the selecting, the moving and the switching is performed when the EOL relief flag has not been set.

18. The operation method according to claim 14,
wherein the storage further includes a third region replaceable with the second region, the first region includes a first copy region where a first copy of the system data is stored and a second copy region where a second copy thereof is stored,
wherein the selecting includes selecting a first victim plane when a remaining capacity of the third region is equal to or less than a first threshold value and is greater than a second threshold value less than the first threshold value,
wherein the moving includes moving the first copy stored in a first source memory block of the first copy region to the second region of the first victim plane, and
wherein the switching includes switching the first source memory block to the region replaceable with the second region.

19. The operation method according to claim 18,
wherein the selecting further includes selecting a second victim plane when the remaining capacity of the third region is equal to or less than the second threshold value,
wherein the moving further includes moving the second copy stored in a second source memory block of the second copy region to the second region of a second victim plane, and
wherein the switching further includes switching the second source memory block to the region replaceable with the second region.

20. The operation method according to claim 19,
further comprising setting an end of life (EOL) relief flag as the selecting the second victim plane, the moving of the second copy and the switching of the second source memory block is performed, and
wherein a process of the selecting of the first victim plane, the moving the first copy and the switching the first source memory block or a process of the selecting the second victim plane, the moving the second copy and the switching the second source memory block is performed when the remaining capacity of the third region is equal to or less than the first threshold value or the second threshold value and the EOL relief flag has not been set.

21. The operation method according to claim 14, further comprising maintaining the original of the system data in the first region.

22. The operation method according to claim 14,
wherein the storage further includes a third region replaceable with the second region, and
wherein the victim plane is selected when a remaining capacity of the third region is equal to or less than a threshold value.

23. A nonvolatile memory system comprising:
a storage including at least two planes each including at least first and second memory blocks, the first memory block being designated as non-accessible for user data and the second memory block being designated as accessible for user data; and
a controller suitable for re-designating the first memory block as accessible for user data and reserve the re-designated first memory block for the second memory block, in a selected one of the planes.

24. The nonvolatile memory system of claim 23, wherein the controller is further suitable for controlling the storage to move data from the re-designated first memory block of the selected plane to the second memory block of the other plane.

25. The nonvolatile memory system of claim 24, wherein the controller is further suitable for controlling the storage to access the re-designated first memory block for user data instead of the second memory block within the selected plane.

* * * * *